United States Patent [19]

Yokota

[11] 4,408,314
[45] Oct. 4, 1983

[54] RECORD/PLAYBACK TRACK TRACKING SERVO

[75] Inventor: Tsuneshi Yokota, Kawasaki, Japan

[73] Assignee: Tokyo Shibaura Denki Kabushiki Kaisha, Kawasaki, Japan

[21] Appl. No.: 237,260

[22] Filed: Feb. 23, 1981

[30] Foreign Application Priority Data

Feb. 29, 1980 [JP] Japan .................................. 55-25082
Feb. 29, 1980 [JP] Japan .................................. 55-25083

[51] Int. Cl.³ .................. G11B 7/00; G11B 19/02; G11B 21/10
[52] U.S. Cl. ......................................................... 369/46
[58] Field of Search .................................. 369/45, 46

[56] References Cited

U.S. PATENT DOCUMENTS

| 4,023,185 | 5/1977 | Bloom et al. | 369/45 |
| 4,243,848 | 1/1981 | Utsumi | 369/45 |
| 4,243,850 | 1/1981 | Edwards | 369/46 |
| 4,310,912 | 1/1982 | Kikuchi et al. | 369/45 |

FOREIGN PATENT DOCUMENTS 51-23900 7/1976 Japan .
55-113139 9/1980 Japan .................................. 369/45

*Primary Examiner*—George G. Stellar
*Attorney, Agent, or Firm*—Cushman, Darby & Cushman

[57] ABSTRACT

A single laser beam emitted from a laser generator driven by a laser driver in a record mode is alternately switched between a recording beam with large power and a tracking beam with small power. The switched beam is focused onto an optical disc through a laser beam transmitting section and then is reflected from the optical disc. The reflected laser beam from the optical disc is received by a pair of photo detecting elements in a two-divided way. Pulsate signal components with peaks corresponding to the recording beam contained in the output signals produced from the photo detecting elements are removed by sample-hold circuits in a wave-shaping section. A level difference between the output signals from the wave-shaping section is detected by a differential amplifier. The output signal from the differential amplifier, that is, a tracking control signal, drives a drive section to move an optical head.

14 Claims, 15 Drawing Figures

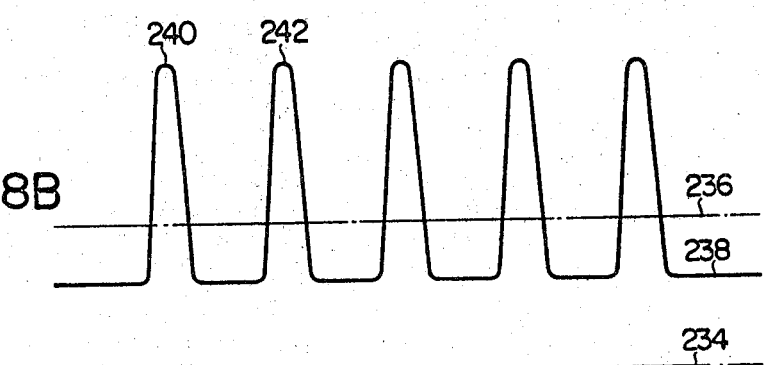
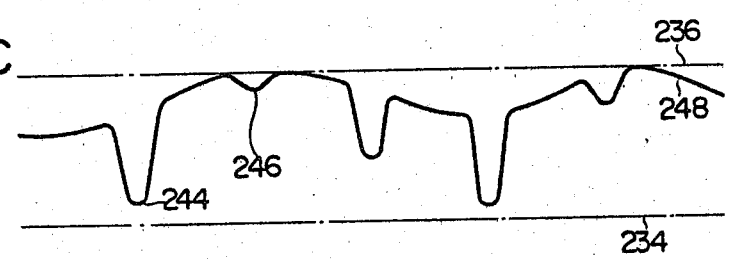
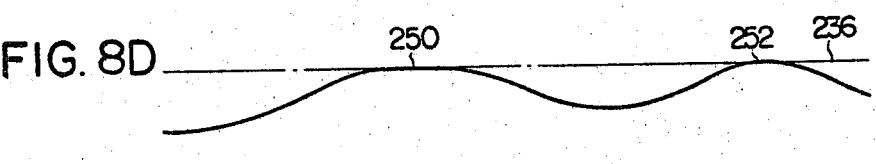
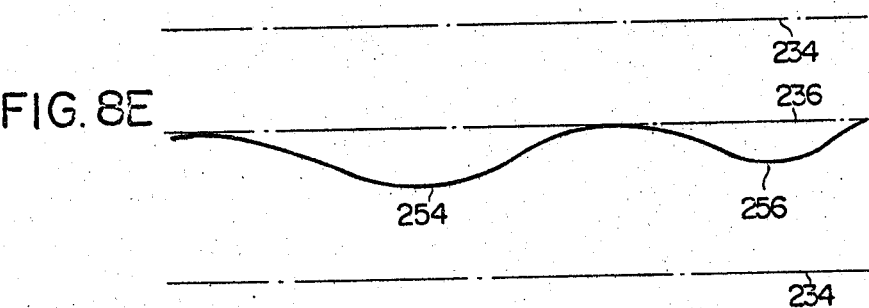

RECORD/PLAYBACK TRACK TRACKING SERVO

The present invention relates to a tracking servo control device and, more particularly, to a tracking servo control device in use for an information record/reproduction apparatus which records and reproduces the information such as pictures into and from a disc by scanning the disc surface with a single laser beam in a non-contact manner.

An apparatus for recording and reproducing the picture information on a large number of documents produced in an office, such as characters and drawings, employs an optical disc as a recording medium in the light of the record capacity and information retrieving speed. The term "optical disc" is a general term meaning a disc-like member which responds to optical energy containing information, which illuminated the disc-like member, to deform at the surface layer thereof and provides a signal corresponding to the original information of the optical energy when the deformed portion of the surface layer is scanned by a given optical beam.

According to the information record/reproduction apparatus, a document to be recorded is scanned two-dimensionally to provide a picture signal representing a variety of patterns on the document. The picture signal is digitized and then converted into a digital FM signal. Subsequently, the device emits a recording laser beam with an intensity corresponding to the digital FM signal, which in turn is focused on a track previously formed on the surface of the optical disc. Since the optical disc is constantly rotated at a given speed, the laser beam scans the disc surface in a fixed direction. The optical disc has at least a metal film with a fixed thickness on the recording surface. The metal film changes its shape in accordance with information contained in the laser beam. Specifically, when the metal film is illuminated by the recording beam with a given intensity or more, the illuminated location of the metal film is welded and deformed to have a hole, called a pit. The location on the metal film which is illuminated by a tracking laser beam with less than the given intensity remains unchanged and reflects the laser beam illuminated. Accordingly, a series of holes, called a train of pits, which correspond to the digital FM signal are formed in the track on the optical disc in a record mode. For reproducing the original picture signal thus recorded on the optical disc, the single laser beam emitted is switched from the recording laser beam to the reproducing laser beam with less than the given intensity. The track on the optical beam is scanned by the reproducing laser beam, so that the reproducing laser beam is reflected from the track in accordance with the pit train formed on the track. The reflected laser beam is converted into an electrical signal by a photo detecting element which is subjected to a given signal converting process to be the original picture signal.

The information record/reproduction apparatus needs a tracking servo control device which can accurately track or trace the track on the optical disc and an advent of such a device has eagerly been desired in this field.

One of the tracking servo control devices, disclosed in Japanese patent application No. 115883/79, for example, is provided with a pair of photo detecting elements arrayed in the radial direction of the optical disc. The reflected laser beam from the optical disc is received by the pair of the photo detecting elements in a two-divided way and then is converted into electrical signals. In this way, the photo detecting elements produce respectively reproducing signals corresponding to the incoming reproducing laser beams received dividedly. Then, envelopes connecting peaks of pulsate waves in the reproducing signals are detected and the envelope waves detected are subjected to a level comparison. In the level comparison, if there is found a level difference between the envelope signals, the tracking servo control device produces a tracking control signal corresponding to the level difference for tracking control to zero the difference. In other words, the tracking control signal drives a drive system to correctly position an optical head and the erroneous displacement of the laser beam spot from the track on the optical disc.

When the prior tracking servo control device is applied for the information record/reproduction apparatus, it is attendent with the following disadvantages since the record/reproduction apparatus uses the same laser beam not only for the reproduction of information but also the record by alternately switching it between the tracking beam and the recording beam. The recording beam has a large energy necessary to weld the metal film on the optical disc, which is several tens times the energy of the tracking or reproducing laser beam. Therefore, the energy reflected from the optical disc surface is very large. When the reflected laser beam with such a high energy is incident into the light detecting elements, the output signals from the photo detecting elements contain pulses with large peaks. These pulses possibly damage the circuitry in the succeeding stage of the photo detecting elements, rendering the circuitry unstable or erroneous in operation. As a result, it is impossible to attain a reliable and high speed tracking control.

Accordingly, an object of the present invention is to provide a reliable and accurate tracking servo control device which can record and reproduce desired information into and from an optical disc extremely easily by blocking a signal component corresponding to an undesired reflected laser beam with a given intensity or more.

A tracking servo control device according to the present invention comprises a light source for radiating a coherent light beam with a single wavelength, and a light beam transmitting means for focusing the light beam at a desired location on an optical disc and selectively picking up a light beam reflected from the optical disc. Further included in the tracking servo control system are photoelectric transducing means which receives the reflected light beam in two-divided way and produces first and second signals corresponding to the light amounts of the divided reflected light beams and means for blocking undesired signal components contained in the first and second signals to produce third and fourth signals corresponding to the first and second signals. Additionally included are means for comparing the third signal with the fourth signal to produce a fifth signal, and means which responds to the fifth signal to mechanically drive at least the light beam transmitting means.

This invention can be more fully understood from the following detailed description when taken in conjunction with the accompanying drawings, in which:

FIGS. 8A to 8E are waveforms at major terminals in the second embodiment shown in FIG. 5.

Figure 1:
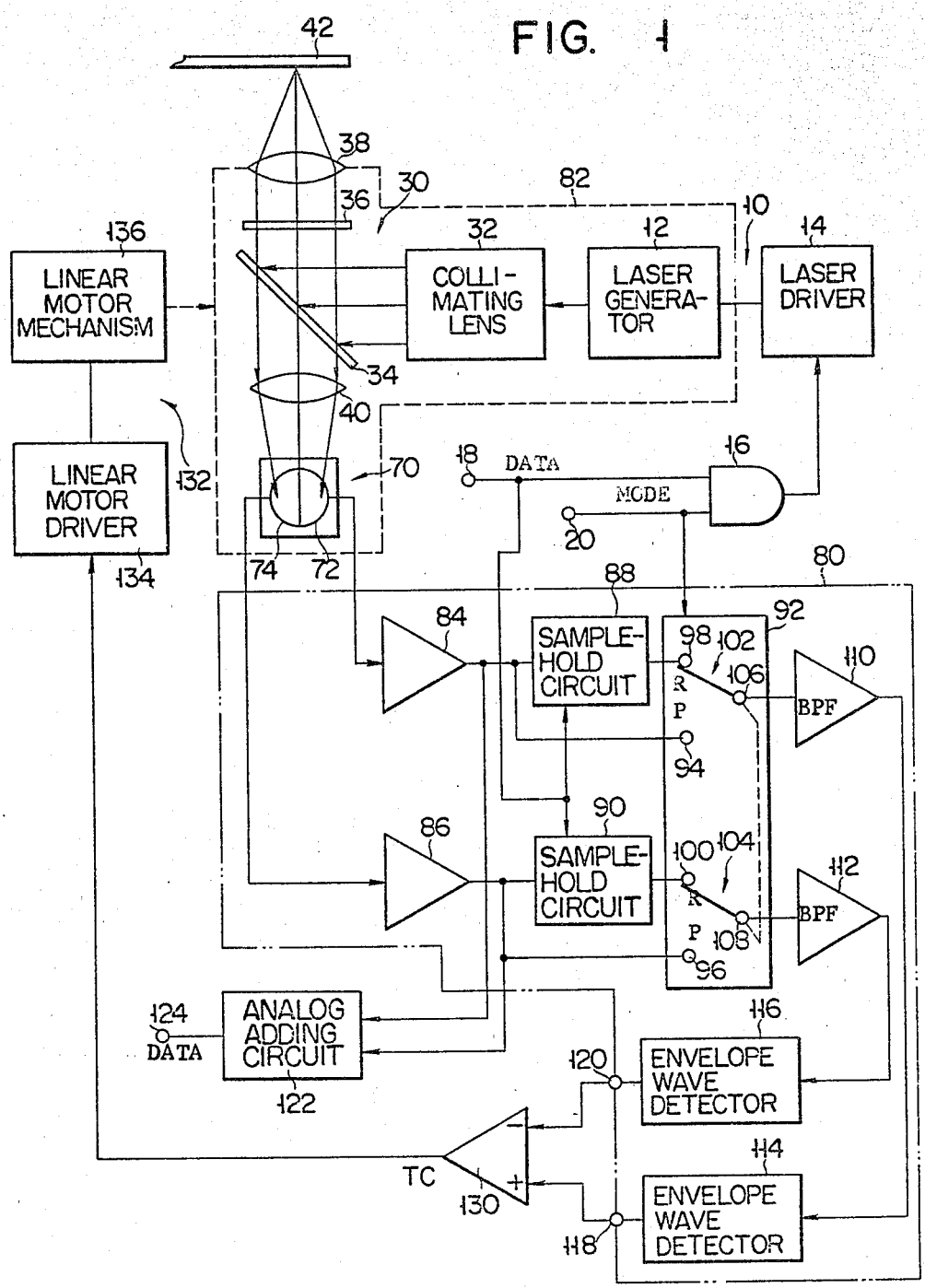
FIG. 1 is a block diagram of a tracking servo control device which is an embodiment according to the present invention.

Referring first to FIG. 1, there is shown a first embodiment of a tracking servo control device according to the present invention. In the figure, a light source section 10 includes a laser generator 12 of, for example, a semiconductor junction type laser diode, and a laser driver 14 coupled with an input terminal of the laser generator 12. An input terminal of the laser driver 14 is connected to an output terminal of an AND circuit 16 which is connected at one input terminal to an input terminal 18 for recording information. The other input terminal of the AND circuit 16 is connected to an input terminal 20 for mode signal input. A laser beam emitted from the laser generator 12 is switched between two laser beams with desired intensities by the laser driver 14. One laser beam switched has substantially large power, for example, about 30 mW, corresponding to a recording laser beam. The other laser beam switched has a relatively small power, for example, about 1 mW, corresponding to a tracking beam or a reproducing beam. In a record mode, a single laser beam is alternately switched between the recording beam and a tracking beam. The tracking beam is substantially the same as the reproducing beam in a reproduction mode. The laser driver 14 responds to an output signal from the AND circuit 16 to cause the laser generator 12 to emit a large power beam, or the recording beam. When the output signal from the AND circuit 16 is absent, it causes the laser generator 12 to project a small power laser beam, or the tracking beam or the reproducing beam. A laser transmitting section 30 optically coupled with the light source section 10 comprises a collimating lens 32, a polarized beam splitter 34, a ¼ wavelength plate (referred to as a λ/4 plate) 36, an objective lens 38 and a condenser 40. Each of the recording beam, the tracking beam and the reproducing beam is incident on the polarized beam splitter 34, through the collimating lens 32. After the beam is reflected by the beam splitter 34, it is converted by the λ/4 plate 36 from the linearly polarized light beam to a circularly polarized light beam. The circularly polarized laser beam is then focused at a desired spot on an optical disc 42 by the objective lens 38.

Figure 2:
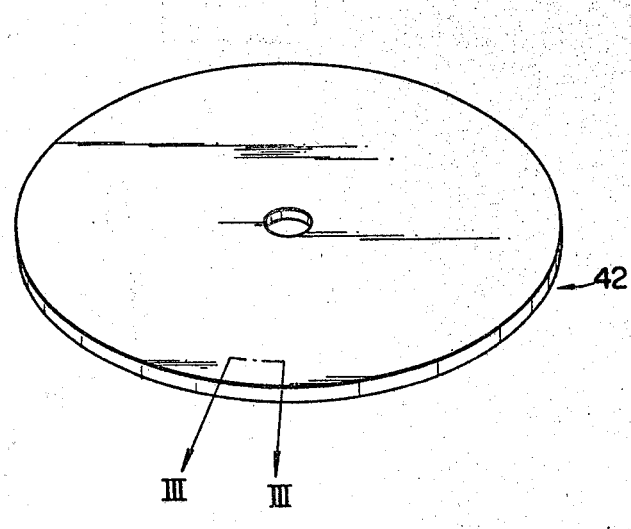
FIG. 2 is a perspective view of an optical disc used in the first embodiment shown in FIG. 1.
Figure 3:
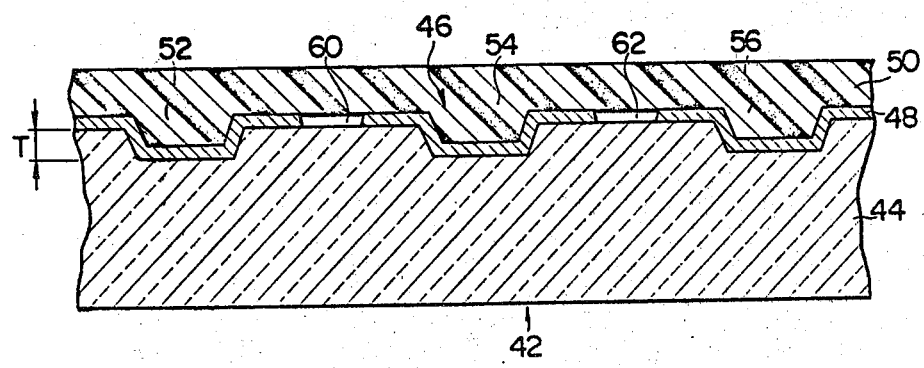
FIG. 3 is an enlarged cross sectional view, partially broken away, taken along line III—III which lies in the peripheral direction of the optical disc shown in FIG. 2.

Turning to FIGS. 2 and 3, there is shown a structure of the optical disc 42 used in the first embodiment under discussion. The diameter of the disc 42 is about 300 mm. A track 46 is spirally or coaxially formed with a pitch from about 1.5 to 2 μm on the surface of a transparent base 44 made of plastic. As well illustrated in FIG. 3 which is an enlarged partial cross section taken along periphery of the track 46, or on line III—III, a metal film 48 with a uniform thickness, e.g. 200 Å, is layered on the entire surface of the transparent base 44 with the track 46. The metal film 48 is made of material which may be weld by the recording beam of those beams radiated from the laser generator 12. Further, in selecting the material, a reflection coefficient of the material with respect to the laser beam used is also taken into account. A protecting layer 50 made of plastic, for example, is further layered over the metal film 48. Concave portions 52, 54 and 56, each called a pre-pit are formed along the track 46 with a given depth T, that is, a depth of ¼ of the wavelength (λ) of the laser beam emitted from the laser generator 12. A distance between the centers of the adjacent pre-pits is approximately 4 μm. Openings 60 and 62 formed in the metal layer 48 between the adjacent pre-pits are the result of the illumination by the recording beam.

The laser beam reflected from the track 46 of the optical disc 42 is led to the condenser 40, through the objective 38, the λ/4 plate 36 and the beam splitter 34. The condenser 40 leads the reflected beam to a photoelectric transducer 70. The photoelectric transducer 70 has a substantially circular configuration including a pair of photo detecting elements 72 and 74 as photo diodes, for example. The laser beam forms an image at the center of the light receiving surface of the photoelectric transducer 70. Accordingly, the laser beam is received by the pair of the photo detecting elements 72 and 74, being divided into two sections. Those photo detecting elements 72 and 74 respectively produce electrical signals corresponding to the intensities of incoming light beams, which are in turn applied to a wave-shaping section 80 to be described later. Practically, the laser generator 12 of the light source section 10, the laser beam transmitting section 30 and the photoelectric transducer 70 are packed or assembled into an optical head 82.

In the wave-shaping section 80, the input terminals of preamplifiers 84, 86 are connected to output terminals of the pair of the photo detecting elements 72 and 74. The output terminals of the preamplifiers 84 and 86 are connected to the input terminals of sample-hold circuits 88 and 90, respectively. The sample-hold circuits 88 and 90 are further connected to reproduction mode terminals 94 and 96 of an analog switch circuit 92. Each of the sample-hold circuits 88 and 90 comprised of a field effect transistor (not shown) samples a signal level (e.g. voltage level) of the signal supplied immediately before a desired time period and holds the signal level for the time period. The output terminals of the sample-hold circuits 88 and 90 are respectively connected to record mode terminals 98 and 100. The other input terminals of the sample-hold circuits 88 and 90 are connected to the record information input terminal 18. The other input terminal of the analog switch circuit 92 is connected to a mode signal input terminal 20. Mode changeover switches 102 and 104 of an analog signal circuit 92 respond to a mode signal transmitted from the terminal 20 to changeover one mode to another in an interlocking manner. The output terminals of the mode changeover switches 102 and 104 are respectively connected to the input terminals of bandpass amplifiers 110 and 112. The output terminals of the bandpass amplifiers 110 and 112 are respectively connected through envelope wave detectors 114 and 116 to output terminals 118 and 120, respectively. The envelope wave detectors 114 and 116 each comprised of an integrating circuit (not shown) respectively detect envelopes of peaks of signal components contained in the signals supplied from the bandpass amplifiers 110 and 112 and produce signals with waveforms of the envelopes. The output terminals of the preamplifiers 84 and 86 of the wave-shaping section 80 are also connected to input terminals of an analog adding circuit 122. An output terminal of the analog adding circuit 122 is coupled with a reproduced signal output terminal 124. The output terminals 118 and 120 of the wave-shaping section 80 are respectively connected to input terminals of a differential amplifier 130. An output terminal of the differential amplifier 130 is connected to an input terminal of a linear motor mechanism 134, through a linear motor driver 134 constituting a drive section 132. The linear drive mechanism 136 is mechanically coupled with the optical head 82 and responds to a tracking control signal TC derived from the differential amplifier 130 to mechanically drive the optical head 82.

Figure 4A:
FIGS. 4A to 4D show waveforms of signals at major terminals in the first embodiment shown in FIG. 1.

The operation of the first embodiment thus constructed will be described in detail. In the case to record desired information, such as a document, on the optical disc, or in the record mode, a train of pulse signals representing information as shown in FIG. 4A are inputted into the AND circuit 16 through the terminal 18. The pulse signal has signal components 138 and 140 corresponding to a picture signal. At this time, a mode signal (not shown) is applied to the AND circuit 16, through the terminal 20. The mode signal is at "1" level in the record mode and at "0" level in the reproduction mode. Accordingly, in the record mode, the AND circuit 16 is ON to allow the recording information pulse signal to be transmitted to the laser driver 14. At this time point, the mode signal is also supplied to the analog switch circuit 92 to turn the mode changeover switches 102 and 104 to the record mode terminals 98 and 100.

Figure 4B:
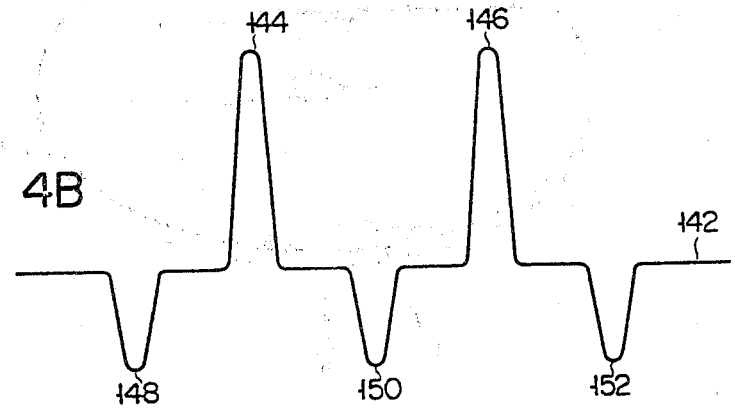
Figure 4C:
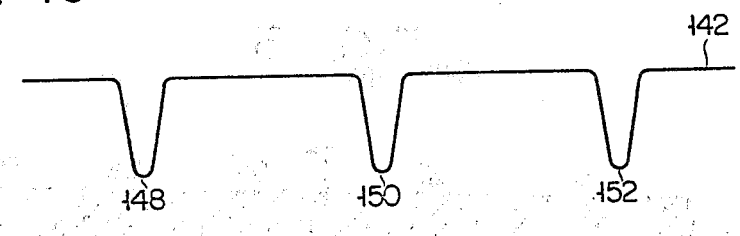

The laser driver 14 to which the recording information pulse signal is applied switches alternately a single laser beam emitted from the laser generator 12 between the recording beam and the tracking beam in accordance with the recording information pulse signal. The laser beam is focused as a spot on the metal film 48. The metal film 48 is welded only when it is illuminated by the recording beam with a high intensity. The recording beam and the tracking beam reflected from the track 46 are introduced into the photoelectric transducer 70, through the laser transmitting section 30. The output signal from each of photo detecting elements 72 and 74 of the photoelectric transducer 70 takes a waveform as shown in FIG. 4B. Contained in the output signal shown in FIG. 4B are positive-going pulsate projections 144 and 146 and negative-going pulsate projections 148, 150 and 152 with respect to a normal level 142. The positive-going projections 144 and 146 correspond to the reflecting recording beams, while the negative-going projections 148, 150 and 152 correspond to pre-pits 52, 54 and 56 formed in the track 46 on the optical disc 42, respectively. When the signal shown in FIG. 4B is applied to the sample-hold circuits 88 and 90 of the wave-shaping section 80, the signal shown in FIG. 4A from the input terminal 18 is also applied to the same circuits 88 and 90. Accordingly, the signal of FIG. 4B is sampled and held only during the time periods of the signal components 138 and 140 by the sample-hold circuits 88 and 90. Specifically, the normal level 142 of the signal wave-form of FIG. 4B immediately before the time periods of the signals 144 and 146 is held only during the time periods. Accordingly, the waveform of the signal outputted from each sample-hold circuit 88 and 90 takes a waveform as shown in FIG. 4C. The output signals from the sample-hold circuits 88 and 90 are respectively applied to the bandpass amplifiers 110 and 112, through the mode changeover switches 102 and 104. The bandpass amplifiers 110 and 112 remove noise components due to scars or dust of the disc and DC components contained in the signals received. The output signals from the bandpass amplifiers 110 and 112 are transferred to the envelope wave detectors 114 and 116 detect envelope waveforms contained in the output signals and then are applied to the differential amplifier 130, through the output terminals 118 and 120 of the wave-shaping section 80.

When there is a level difference between the output signals from the envelope wave detectors 114 and 116, that is, the laser beam spot is off the track 46 on the optical disc 42, the differential amplifier 130 detects a level difference between them and supplies a tracking control signal TC to the drive section 132. The signal TC is positive when the beam spot is at the outer side of the track as viewed in the radial direction of the disc, while it is negative when it is at the inner side of the track. Upon receipt of the signal TC, the drive section 132 adjusts the position of the optical head 82 by a distance corresponding to an erroneous displacement of the laser beam from the track 46. Therefore, a focusing position of the laser beam emitted from the laser transmitting section 30 accommodated in the optical head 82 on the optical disc 42, shifts in the radial direction of the disc to return to the center of the track 46.

Figure 4D:
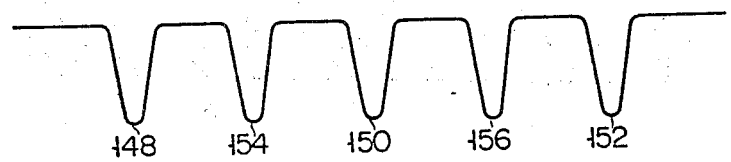

For reproducing the video information recorded in the optical disc as mentioned above, the mode signal with the "0" level is applied to the AND circuit 16 through the terminal 20 and is also applied to the analog switch circuit 92. Accordingly, the AND circuit 16 is OFF, so that the mode changeover switches 102 and 104 of the analog switch circuit 92 are turned to the reproduction mode terminals 94 and 96, respectively. At this time, no output signal from the AND circuit 16 is produced, so that the laser generator 12 generates only the reproducing beam under control of the laser driver 14. The reproducing beam is transmitted to the track 46 (FIGS. 2 and 3) on the optical disc 42 by the laser transmitting section 30, through the optical path as mentioned above. The reflecting laser beam therefrom enters again the laser beam transmitting section 30 and reaches the photoelectric transducer 70. At this time, the output signal from the photo detecting elements 72 and 74 have a waveform as shown in FIG. 4D. As shown, the waveform has negative-going pulse projections 154 and 156 corresponding to the welded portions 60 and 62 of the metal film 48 interplaced among the negative-going pulsate projections corresponding to the pre-pits. The signal of FIG. 4D is applied to the differential amplifier 130, through the mode changeover switches 102 and 104, the bandpass amplifiers 110 and 112, and the envelope wave detectors 114 and 116. Thus, the signal of FIG. 4D never passes through the sample-hold circuits 88 and 90. The subsequent operation in the reproduction mode is exactly the same as that in the record mode. For this reason, such an operation will be omitted.

Thus, in the tracking servo control device of the first embodiment of the present invention, the reflecting laser beam resulting from the irradiation of the recording beam on the optical disc 42 is converted into an electrical signal corresponding to the intensity of the laser beam by the pair of the photo detecting elements 72 and 74. The signal component with high peak values corresponding to the high intensity of the reflecting laser beam of the recording beam is shut off by the sample-hold circuits 88 and 90 in the wave-shaping section 80. Therefore, the circuits such as the differential amplifier 130 are never disturbed and instable in operation. When the laser beam spot accidentally fails to impinge on the track on the optical disc, the tracking servo control device of the invention may stably provide a correct tracking control signal corresponding to the beam spot shift for correcting the shift, irrespective of the record or reproduction mode. Further, the tracking servo control device can correctly and quickly record and reproduce the information while tracking the optical disc by using the single laser beam. Therefore, the construction of the overall device is simple little suffering from troubles, leading to improvement of reliability.

Figure 5:
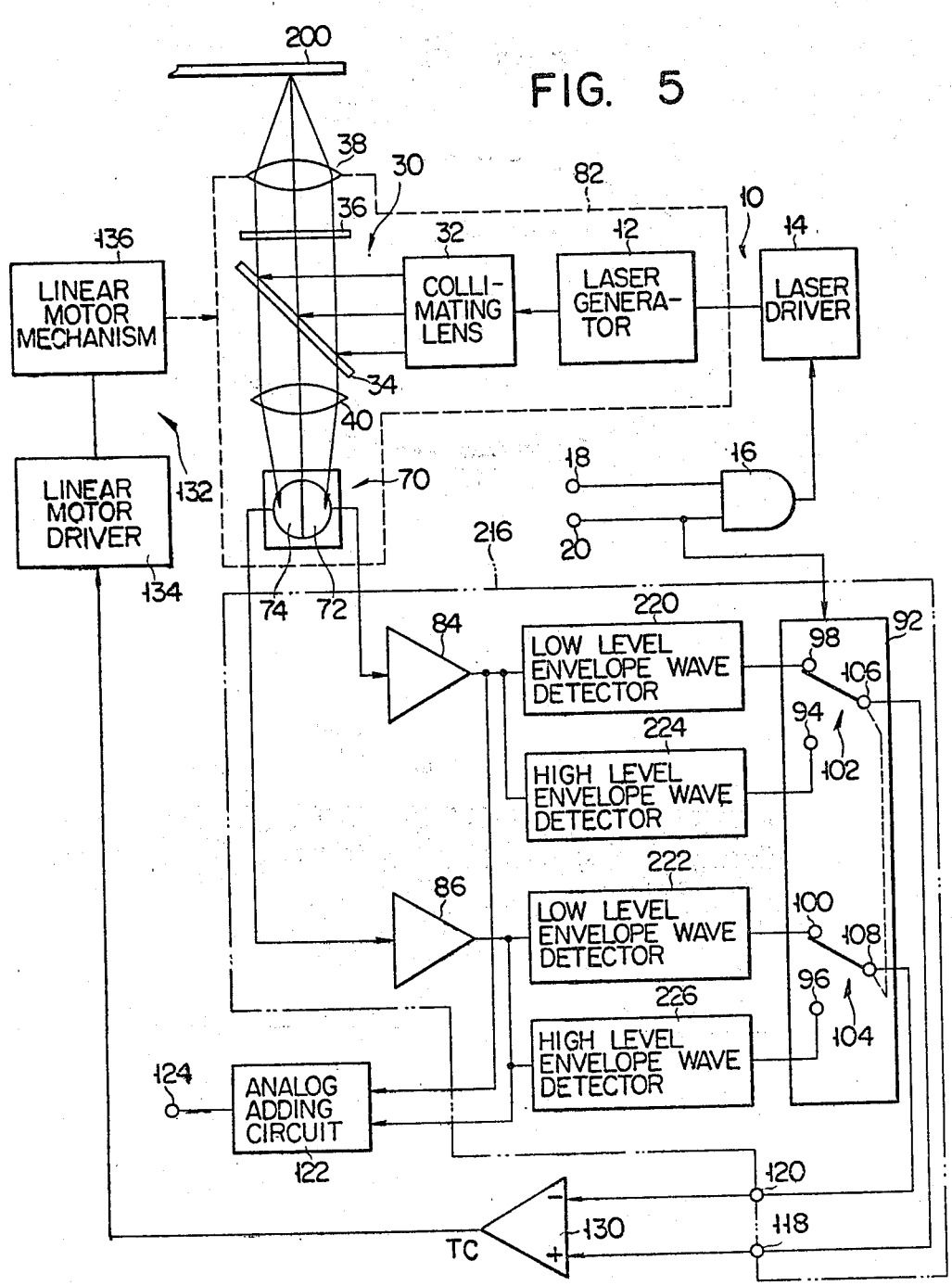
FIG. 5 is a block diagram of a tracking servo control device which is a second embodiment according to the present invention.
Figure 6:
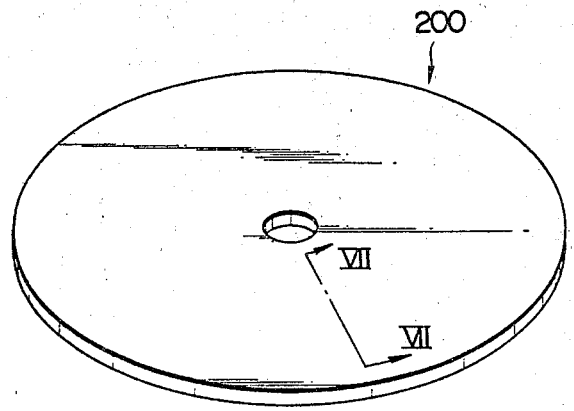
FIG. 6 is a perspective view of a second embodiment in FIG. 5.
Figure 7:
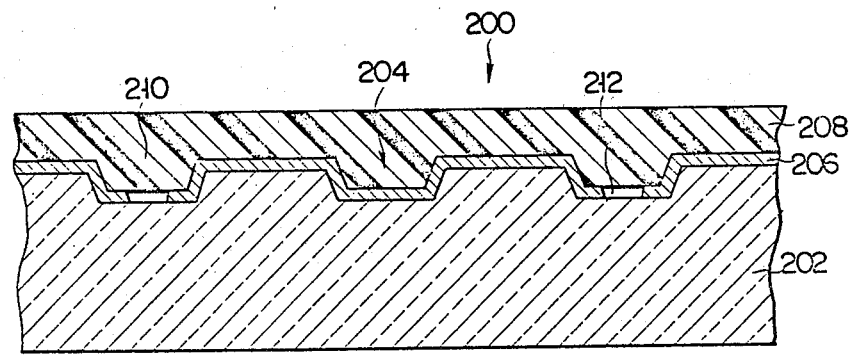
FIG. 7 is an enlarged cross sectional view, partially broken away, taken along line VII—VII lying in the radial direction of the optical disc shown in FIG. 6.

Turning now to FIGS. 5 to 7, there is shown a second embodiment of a tracking servo control device according to the present invention. In FIGS. 6 and 7, an optical disc 200 used in the second embodiment has a single groove of track 204 with a given configuration, e.g. a spiral, on the surface of the transparent base 202. The groove of track 204 has a depth of about ⅛ of the wavelength of the laser beam uniformly over the entire length of the track 204. Further, a metal film 206 is uniformly formed on the surface of the transparent base 202 on which the track 204 is formed. A protective layer 208 is further layered on the metal film 206. When the bottom of the groove of the track 204 is illuminated by the recording beam, openings 210 and 212 are formed at the corresponding locations of the metal film 206.

In FIG. 5, the output terminals of the preamplifiers 84 and 86 of the wave-shaping section 216 are respectively connected to the input terminals of a couple of low and high level envelope wave detectors 220 and 224 and another couple of low and high level envelope wave detectors 222 and 226. The low level envelope wave detectors 220 and 222 detect respectively envelopes wave of low level peaks contained in the signals from the preamplifiers 84 and 86. On the other hand, the high level envelope wave detectors 224 and 226 detect envelopes of the high level peaks contained in the same signals. The output terminals of the low level envelope wave detectors 220 and 222 are connected to the record mode terminals 98 and 100 of the mode changeover switches 102 and 104 of the analog switch circuit 92, respectively. The output terminals of the high level envelope wave detectors 224 and 226 are connected to the reproduction mode terminals 94 and 96, respectively. The output terminals of the mode changeover switches 102 and 104 are applied to the input terminals of the differential amplifier 130, through the terminals 118 and 120. The remaining portion of the second embodiment is the same as that of the first embodiment. Accordingly, no elaboration of it will be given by using like reference numerals for designating like portions in the first embodiment.

The operation of the second embodiment with such a construction will be described. In the record mode, the record information pulse signal as shown in FIG. 8A is applied to the AND circuit 16 through the terminal 18. The signal of FIG. 8A contains positive-going pulsate projections 230, 232, . . . corresponding to a picture signal. At the same time, the record mode signal, i.e. a signal of "1" level, is applied to the AND circuit 16 and the analog switch circuit 92, through the terminal 20. As a result, the mode changeover switches 102 and 104 of the analog switch circuit 92 are turned to the record mode terminals 98 and 100, respectively. At this time, the AND circuit 16 is ON to allow the signal of FIG. 8A to be transmitted to the laser driver 14. Accordingly, the laser generator 12 responds to the signal of FIG. 8A to switch a single laser beam between the recording beam and the tracking beam. The laser beam from the laser generator 12 is focused on the track groove of the optical disc 200 in the form of a spot. The metal film 206 is welded and deformed only when it is illuminated by the recording beam. Therefore, openings 210 and 212 (FIG. 7) are formed in the track 204 corresponding to the positive-going projections 230, 232, . . . of the signal shown in FIG. 8A. The reflected laser beams of the recording beam from the optical disc 200 is led to the photoelectric transducer 70 via the laser beam transmitting section 30.

The photo detecting elements 72 and 74 of the photoelectric transducer 70 supply signals illustrated in FIG. 8B to the preamplifiers 84 and 86. As shown, the signal of FIG. 8B contains a flat portion 238 between a minimum level 234 and a maximum level 236 corresponding to an amount of the reflected laser beam from the metal film 206 on the transparent base except the track groove 204 of the optical disc 200. The potential difference between the maximum level 236 and the flat portion 238 corresponds to the depth of the track groove 204. The signal shown in FIG. 8B further contains positive-going pulsate projections 240, 242, . . . with high peaks corresponding to the reflected laser beam of the recording beam which correspond to the projections 230, 232, . . . in the signal of FIG. 8A. When the signals of FIG. 8B are applied to the low level envelope wave detectors 220 and 222, the detectors 220 and 222 detect envelopes wave of the low level portions, i.e. the flat portions 238, in the signal of FIG. 8B. The output signals from the low level envelope wave detectors 220 and 222 are supplied to the differential amplifier 130, through the analog switch circuit 92. The subsequent operation of the second embodiment are similar to that of the first embodiment and therefore no further description of it will be given here.

In the reproduction mode, the AND circuit 16 is OFF, so that the laser generator produces the reproducing beam. When the reproducing beam temporarily fails to track the groove 204 of the optical disc 200 due to an accident, for example, vibration externally applied, the amounts of the reflected laser beams from the disc to the photo detecting elements 72 and 74 are different with each other. Specifically, when the reproducing beam spot temporarily moves off the track 204 toward the periphery of the disc and returns to the track 204, the amount of the light received by the photo detecting element 72 increases to be larger than or equal to that of the other element 74. Therefore, the output signal from the photo detecting element 72 takes a waveform as shown in FIG. 8C, for example. In the signal of FIG. 8C, negative-going pulsate portions 244, 246, . . . correspond to the openings 210 and 212, respectively. The remaining portions 248 of the waveform of FIG. 8C corresponding to the flat portions 238 of FIG. 8B are curved. The signal shown in FIG. 8C is inputted through the preamplifier 84 into the high level envelope wave detector 224 which in turn produces an envelope signal with a waveform as shown in FIG. 8D. The peaks 250 and 252 of the envelope signal arise from the fact that the reproducing beam spot is off the track 204 and the reflected light amount increases to such a degree. On the other hand, the signal produced from the high level envelope wave detector 226, which corresponds to the output signal of the other photo detecting element 74, takes a waveform as shown in FIG. 8E. Bottoms 254 and 256 in the waveform shown in FIG. 8E appear corresponding to the peaks 250 and 252 in FIG. 8D, respectively. Those signals of FIGS. 8D and 8E are supplied to the differential amplifier 130 through the terminals 118 and 120, respectively. Then, the differential amplifier 130 produces a tracking control signal TC corresponding to the potential difference between the peaks 250 and 252 and the bottoms 254 and 256. The subsequent operation is similar to that of the first embodiment and hence no explanation of it will be given.

In the second embodiment as mentioned above, the desired information are recorded into the track groove on the optical disc 200. Therefore, there is no need for the pre-pits used in the first embodiment, so that a recording capacity of the optical disc is increased to have a high density of information recording. Additionally, the envelopes in the signals by the recording beams and the reproducing beams are surely detected with the provision of the low level envelope wave detectors 220 and 222 and the high level envelope wave detectors 224 and 226, which operate in accordance with the respective record and reproduction modes. The use of those low and high level envelope wave detectors completely removes the pulsate signal components with high intensity corresponding to the reflected light beam of the recording beam from the disc, so that there never occurs disturbance or instableness in the circuit operation. Moreover, if the beam spot is incidentally off the track 204, a correct tracking control signal TC is stably produced from the differential amplifier 130. Further, since the bandpass amplifiers are not used, the circuit construction of the wave-shaping circuit is simplified, with the result that the tracking servo control device has an extremely high reliability and small power consumption.

Although the present invention has been shown and described with respect to particular embodiments, nevertheless various changes and modifications which are obvious to a person skilled in the art to which the invention pertains are deemed to lie within the spirit, scope and contemplation of the invention. In the above-mentioned embodiments, the laser generator 12, the laser transmitting section 30 and the photoelectric transducer 70 are all packed into the optical head 82 and the optical head 82 which is driven by the linear motor mechanism 136. Alternatively, the spot location of the laser beam on the optical disc may be adjusted by driving only the objective lens 38 of the laser transmitting section 30. The pre-pits 52, 54 and 56 which are concaved may be convexed so long as the reflected laser beam from the pre-pits and the laser beam incident into the same are out of phase. For the same season, the track 204 on the optical disc 200 of FIGS. 6 and 7 which are grooved may be a continuous line of projection. The configuration of the track 204 as viewed above is not limited to the spiral but may be an aggregation of many circles coaxially arranged. Further, the projection layers 50 and 208 on the optical discs 42 and 200 shown in FIGS. 2 and 3 and FIGS. 6 and 7 are not essential to the present invention. If necessary, those may be omitted.

What is claimed is:

1. A tracking servo control device for maintaining track registration during the recording onto or playback from a track of a rotating disc-shaped recording medium having a recording layer, comprising:
   (a) laser source means for alternately generating first and second intensity laser beams during recording and for continuously generating a laser beam of said first intensity during playback, said second intensity being greater than said first intensity and being sufficient to change said recording layer so as to record data on said recording layer in an optically readable manner;
   (b) an optical head movable in a radial direction of said rotating recording medium;
   (c) laser beam transmitting means, within said optical head, for focusing said laser beams onto said recording layer and conducting light reflected from said recording layer in a predetermined direction;
   (d) photoelectric transducing means, within said optical head having two photo detecting elements, for generating, in response to light reflected from said recording layer and transmitted via said laser beam transmitting means, first and second electrical signals corresponding to a first portion of light so transmitted and to a second remaining portion of the light, respectively, each electrical signal containing first and second components corresponding respectively to said first and second intensity laser beams reflected from the record layer;
   (e) wave-shaping means, electrically coupled to said photoelectric transducing means, for removing said second component from each of said first and second signals during recording to produce respectively corresponding third and fourth electrical signals;
   (f) signal generating means, electrically coupled to said wave-shaping means, for detecting a level difference between said third and fourth electrical signals and generating a fifth electrical signal corresponding to the level difference therebetween; and
   (g) drive means, electrically coupled to said signal generating means and mechanically coupled to said optical head, for driving said optical head in response to said fifth electrical signal to thereby adjust its position relative to said track of the recording medium so that said laser beams correctly illuminate said track.

2. A tracking servo control device according to claim 1, wherein said track comprises a path of predetermined configuration and a metal film therein which deforms when exposed to said second intensity laser beam.

3. A tracking servo control device according to claim 1, wherein said laser source means includes a laser beam generator and a laser driver for selectively changing an intensity of the laser beam generated by said laser generator.

4. A tracking servo control device according to claim 3, wherein said laser driver switches the laser beam from said laser generator between said first intensity and said second intensity.

5. A tracking servo control device according to claim 1, wherein said two photo detecting elements are arrayed in the radius direction of the recording medium to produce the first and second signals, respectively corresponding to the amounts of the light reflected from the recording medium.

6. A tracking servo control device according to claim 5, wherein said wave-shaping means comprises:

first and second preamplifier means respectively connected to said first and second photo detecting elements for amplifying said first and second signals;

first and second sample and hold circuit means respectively connected to said first and second preamplifier means for sampling and holding signal levels before a desired period during said desired period;

first and second bandpass amplifier means for respectively amplifying only desired frequency components of the signals produced from said first and second sample and hold circuit means;

analog switch means, coupled to said first and second sample and hold circuit means, for selectively transferring the output signals from said first and second envelope detecting means and the low potential envelope signal from said third or fourth envelope detecting means.

7. A tracking servo control device according to claim 5, wherein said wave-shaping means comprises:

first and second preamplifier means respectively connected to said first and second photo detecting elements;

first and second envelope detecting means respectively connected to said first and second preamplifier means for detecting a high potential envelope of said output signals generated from said first and second preamplifier means;

third and fourth envelope detecting means respectively connected to said first and second preamplifier means for detecting a low potential envelope of said output signals generated from said first and second amplifier means; and analog switch means for selecting either the high potential envelope or the low potential envelope.

8. A tracking servo control device according to claim 1 wherein said second intensity is sufficient to melt said recording layer.

9. A tracking servo control device according to claim 1, wherein said driving means comprises:

a linear motor mechanism for mechanically moving at least said light beam transmitting means; and a driver for controlling a direction and an amount of the operation of said linear motor mechanism in response to a sign and an amplitude of said fifth signal from said signal generating means.

10. A tracking servo control device according to claim 1, wherein said wave-shaping means comprises:

first and second preamplifier means respectively connected to said first and second photo detecting elements for amplifying the first and second signals;

first and second sample and hold circuit means respectively connected to said first and second preamplifier means for sampling and holding signal levels before a desired period during the desired period;

first and second bandpass amplifier means for respectively amplifying only desired frequency components contained in the signals produced from siad first and second sample and hold circuit means; p1 analog switch means connected to said first and second sample and hold circuit means for selectively transferring the output signals from said first and second sample and hold circuit means to said first and second bandpass amplifier means; and first and second envelope detecting means respectively connected to said first and second bandpass amplifier means for detecting envelope waves of signal components of the signals from said first and second bandpass amplifiers.

11. A tracking servo control device according to claim 1, wherein said wave-shaping means comprises:

first and second preamplifier means respectively connected to said first and second photo detecting elements;

first and second envelope detecting means respectively connected to said first and second preamplifier means for detecting a high potential envelope of said output signals generated from said first and second preamplifier means;

third and fourth envelope detecting means respectively connected to said first and second preamplifier means for detecting a low potential envelope of said output signals generated from said first and second amplifier means; and analog switch means for selecting either said high potential envelope or said low potential envelope.

12. A tracking servo control device according to claim 1, wherein said wave-shaping means comprises:

first and second sample and hold circuit means, electrically connected to said photoelectric transducing means, for receiving said first and second signals, respectively, and holding, for the duration of said second components, values of said first and second signals respectively representing the levels of said signals immediately preceding said second components; and switch means, electrically connected to said sample and hold circuit means, for receiving said values from said sample and hold circuit means, detecting from said values a period which falls within the duration of generating the second intensity laser beam and which is identical with the duration of said second component, supplying the first and second electrical signals to said sample and hold circuit means during this period and preventing the supply of the first and second electrical signals to said sample and hold circuit means during all other times.

13. A tracking servo control device according to claim 1, wherein:

said recording medium is an optical disc comprising a transparent substrate and having a spiral groove cut in a surface thereof and a metal recording layer formed on a surface of said transparent substrate and having a uniform thickness, said first and second intensity laser beams being controlled to illuminate that portion of said metal recording layer which is formed in said spiral groove constituting said track, and said wave-shaping means comprises first and second envelope wave detector means, electrically connected to said photoelectric transducing means, for receiving said first and second electrical signals while the device is recording and detecting low level envelope waves of the first and second electrical signals thereby to remove said second components from said first and second electrical signals.

14. A tracking servo control device according to claim 13, wherein said wave-shaping means further comprises:

third and fourth envelope wave detector means, electrically connected in parallel to said first and second envelope wave detector means, respectively, for receiving said first and second electrical signals, respectively and detecting high level envelope waves of the first and second electrical signals during playback; and switch means for supplying said first and second electrical signals to the first and second envelope detector means, respectively, during recording and supplying said first and second electrical signals to said third and fourth envelope detector means, respectively, during playback.

* * * * *